US012695280B2

(12) United States Patent (10) Patent No.: US 12,695,280 B2
Obayashi et al. (45) Date of Patent: Jul. 28, 2026

(54) WIRE COATING REMOVAL DEVICE AND WIRE FORMING SYSTEM

(71) Applicant: ASAHI-SEIKI MANUFACTURING CO., LTD., Owariasahi (JP)

(72) Inventors: Eiji Obayashi, Nagoya (JP); Takashi Nojima, Nagoya (JP); Ryota Fukatsu, Owariasahi (JP)

(73) Assignee: ASAHI-SEIKI MANUFACTURING CO., LTD., Owariasahi (JP)

( * ) Notice: Subject to any disclaimer, the term of this patent is extended or adjusted under 35 U.S.C. 154(b) by 626 days.

(21) Appl. No.: 18/178,125

(22) Filed: Mar. 3, 2023

(65) Prior Publication Data

US 2023/0318271 A1 Oct. 5, 2023

(30) Foreign Application Priority Data

Mar. 29, 2022 (JP) ................................. 2022-053210

(51) Int. Cl.
*H02G 1/12* (2006.01)

(52) U.S. Cl.
CPC ................................. *H02G 1/1265* (2013.01)

(58) Field of Classification Search
CPC .. H02G 1/1265; H02G 1/1285; H02G 1/1268; H02G 1/1248; H02G 1/12;
(Continued)

(56) References Cited

U.S. PATENT DOCUMENTS 5,596,802 A 1/1997 Koch et al.
5,781,984 A 7/1998 Koch et al.
(Continued)

FOREIGN PATENT DOCUMENTS

CN 1516913 A 7/2004
JP S6167533 A * 4/1986
(Continued)

OTHER PUBLICATIONS

Yatsuo JPS6167533A Publication Apr. 7, 1986 retrieved translation from GOOGLE: https://patents.google.com/patent/JPS6167533A/ en?oq=JPS6167533A (Year: 1986).*
(Continued)

*Primary Examiner* — Monica S Carter
*Assistant Examiner* — Christopher Soto
(74) *Attorney, Agent, or Firm* — Oliff PLC

(57) ABSTRACT

A wire coating removal device includes: a wire feed path; a pair of first rotary tools that remove a coating of the wire at a first position on the wire feed path; a first rotary drive mechanism that rotationally drives the pair of first rotary tools; a pair of second rotary tools that remove the coating of the wire at a second position; a second rotary drive mechanism that rotationally drives the pair of second rotary tools; a first tool distance changing mechanism that makes the pair of first rotary tools approach or separates from each other; and a second tool distance changing mechanism that makes the pair of second rotary tools approach or separates from each other, wherein the pair of first rotary tools remove a part of the coating of the wire, and the pair of second rotary tools then remove a remainder of the coating.

1 Claim, 16 Drawing Sheets

(58) Field of Classification Search
CPC .. H02G 1/1221; H02G 1/1229; H02G 1/1236;
H02G 1/1243; H02G 1/127; H01B
13/01209; H01B 13/01236; H01B
13/01254; H01B 9/006; H01B 13/0003;
H01F 41/04
See application file for complete search history.

(56) References Cited

U.S. PATENT DOCUMENTS

| | | |
|---|---|---|
| 10,546,670 B2 | 1/2020 | Izumi et al. |
| 2004/0134965 A1 | 7/2004 | Stepan |
| 2021/0101197 A1 | 4/2021 | Fu |

FOREIGN PATENT DOCUMENTS

| | | | |
|---|---|---|---|
| JP | S61-127953 U | 8/1986 | |
| JP | S62-48471 B2 | 10/1987 | |
| JP | H01-83066 U | 6/1989 | |
| JP | H05-14496 B2 | 2/1993 | |
| JP | H08-24941 A | 1/1996 | |
| JP | H08-65847 A | 3/1996 | |
| JP | H10-244388 A | 9/1998 | |
| JP | H11-196513 A | 7/1999 | |
| JP | 2006217680 A | 8/2006 | |
| JP | 2007189857 A | 7/2007 | |
| JP | 4304509 B2 * | 7/2009 | .......... H02G 1/1285 |
| JP | 2011-234447 A | 11/2011 | |
| JP | 6467679 B2 | 2/2019 | |
| JP | WO2019/207989 A1 | 12/2020 | |
| JP | 2021-059008 A | 4/2021 | |
| WO | 2019/207989 A1 | 10/2019 | |
| WO | 2021/047953 A1 | 3/2021 | |

OTHER PUBLICATIONS

Nakahara JP 4304509 B2 Publication Jul. 29, 2009 retrieved translation from ESPACENET: https://worldwide.espacenet.com/patent/search/family/036980410/publication/JP4304509B2?q=JP%204304509%20B2 (Year: 2009).*

Aug. 30, 2023 Office Action issued in European Patent Application No. 23162957.7.

May 10, 2022 Office Action issued in Japanese Patent Application No. 2022-053210.

Jul. 27, 2022 Office Action issued in Japanese Patent Application No. 2022-053210.

Aug. 4, 2023 Extended Search Report issued in European Patent Application No. 23162957.7.

Apr. 20, 2024 Office Action issued in Korean Patent Application No. 10-2023-0017753.

May 8, 2025 Office Action issued in European Patent Application No. 23 162 957.7.

Apr. 24, 2026 Office Action issued in Chinese Patent Application No. 202310218647.0.

* cited by examiner

F    R

F    R

WIRE COATING REMOVAL DEVICE AND WIRE FORMING SYSTEM

BACKGROUND OF THE INVENTION

(1) Field of the Invention

The present disclosure relates to a wire coating removal device for removing a coating of a wire, and a wire forming system including the wire coating removal device.

(2) Description of Related Art

Conventionally, there has been known a wire coating removal device capable of forming a pair of exposed surfaces by sandwiching a wire with a pair of tools at any desired position in the longitudinal direction on the wire and thereby removing a coating covering the wire (see, for example, Paragraph [0019] and FIGS. 5 and 6 of WO2019/207989).

SUMMARY OF THE INVENTION

There is a demand for development of a technique capable of forming an exposed surface on a wire, which formation of an exposed surface is impossible with conventional techniques.

A wire coating removal device according to one aspect of the present disclosure made to solve the above issue includes: a wire feed path on which a wire is fed in a state of being linearly extended; a pair of first rotary tools that remove a coating of the wire while sandwiching the wire from a first direction at a first position on the wire feed path; a first rotary drive mechanism that rotationally drives the pair of first rotary tools; a pair of second rotary tools that remove the coating of the wire while sandwiching the wire, from a second direction intersecting the first direction, at a second position on the wire feed path; a second rotary drive mechanism that rotationally drives the pair of second rotary tools; a first tool distance changing mechanism that makes the pair of first rotary tools approach or separate from each other in association with feeding of the wire; and a second tool distance changing mechanism that makes the pair of second rotary tools approach or separate from each other in association with feeding of the wire, wherein the pair of first rotary tools remove a part of the coating on a work target part that is dispersedly disposed in a longitudinal direction of the wire, and the pair of second rotary tools then remove a remainder of the coating on the work target part.

DETAILED DESCRIPTION OF PREFERRED EMBODIMENTS

First Embodiment

Figure 1:
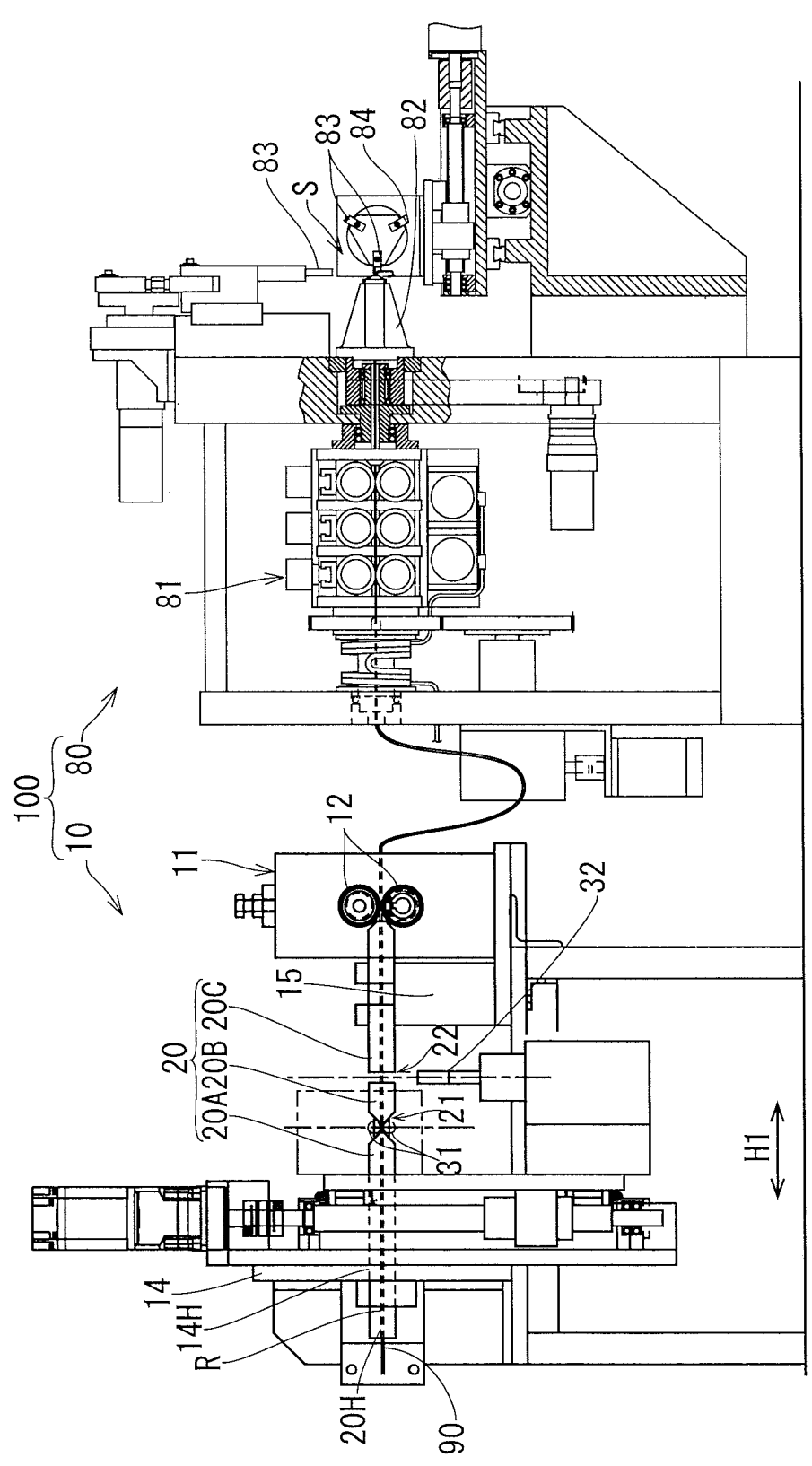
FIG. 1 is a front view of a wire forming system according to a first embodiment of the present disclosure.
Figure 2A:
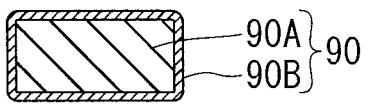
FIG. 2A is a sectional view illustrating an example of a wire.

Hereinafter, a wire forming system 100 according to a first embodiment of the present disclosure will be described with reference to FIGS. 1 to 11. As illustrated in FIG. 1, the wire forming system 100 includes a wire coating removal device 10 and a wire forming machine 80, and a formed-wire article 91 is formed by the wire forming machine 80 after coating removal working is performed on a wire 90 by the wire coating removal device 10. FIG. 2A illustrates an example of the wire 90, and FIG. 2B illustrates an example of the formed-wire article 91.

As illustrated in FIG. 2A, the wire 90 has, for example, a structure in which a wire body 90A, which is a conductive metal, is covered with an insulating coating 90B, and the wire 90 has a cross-sectional shape of, for example, a flat rectangle. In addition, the metal constituting the wire body 90A is, for example, copper or a copper alloy, and the coating 90B is, for example, enamel.

The wire 90 of the present embodiment has a flat quadrangular cross-section; however, the shape of the cross-section is not limited to a flat quadrangle, and the cross-sectional shape may be a polygon other than a quadrangle, a circle, or an ellipse. In addition, the metal constituting the wire body 90A is not limited to copper or a copper alloy, and may be any material as long as the material is formable, and may be a non-conductive member. In a case where the wire coating removal device 10 is used separately from the wire forming machine 80, the wire body 90A may be a non-formable member. In the present embodiment, the coating 90B is, for example, enamel, but may be an insulating resin, and does not have to be insulating as long as it covers the wire body 90A. Further, the wire body 90A and the coating 90B each may have a single layer structure or a multilayer structure.

Figure 2B:
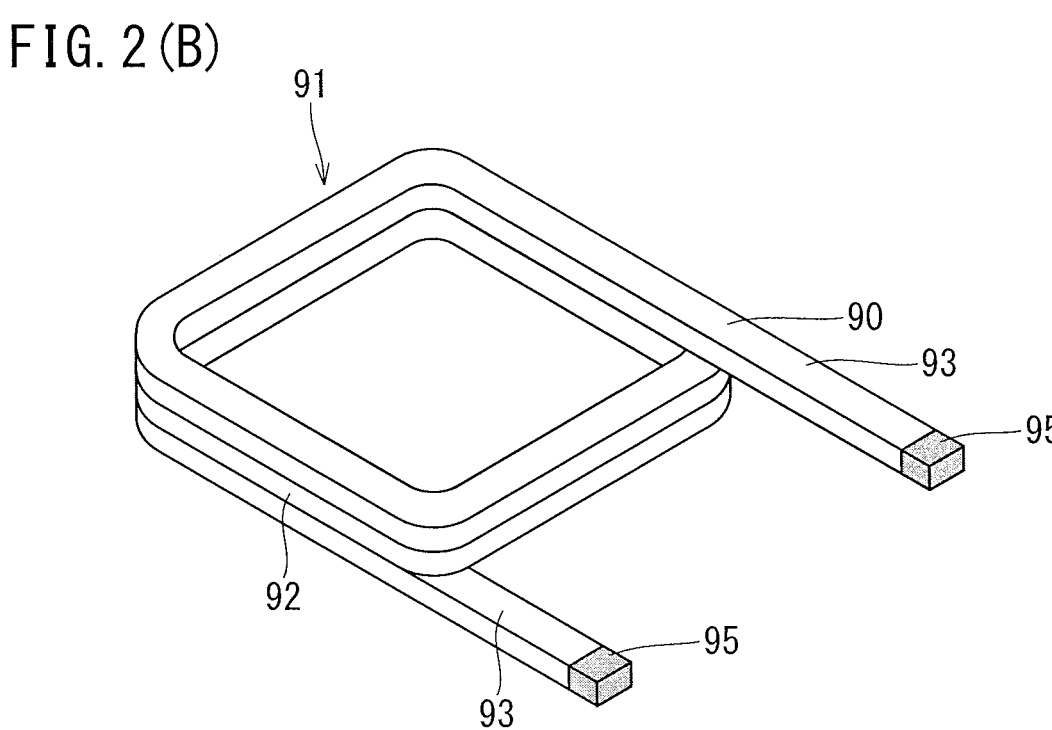
FIG. 2B is a perspective view illustrating an example of a formed-wire article.

As illustrated in FIG. 2B, the formed-wire article 91 of the present embodiment is, for example, a coil, and has a structure in which a pair of extension parts 93 extend from a coil body 92. A tip part of each extension part 93 has an electrical connection part 95 in which the wire body 90A is exposed on a tip end surface and four side surfaces.

Figure 2C:
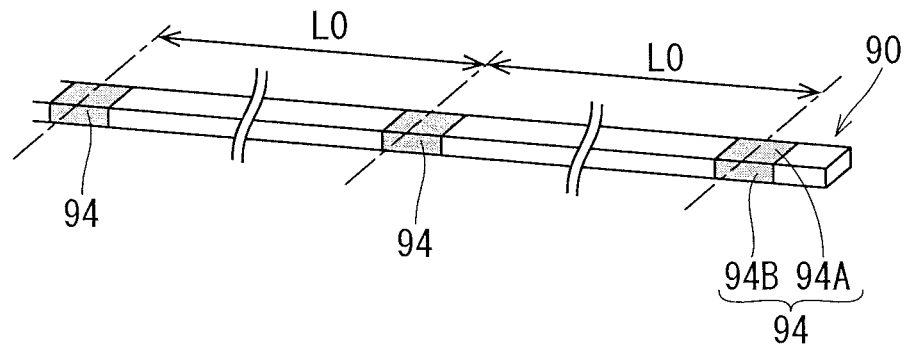
FIG. 2C is a perspective view illustrating an example of a wire on which coating removal working has been performed.

As illustrated in FIG. 2C, the wire coating removal device 10 removes a predetermined length of the coating 90B from the wire 90 at a predetermined distance interval LO, which is a development length of the formed-wire article 91, to form an exposed surface 94 of the wire body 90A. Each exposed surface 94 includes a pair of first exposed surfaces 94A positioned on both upper and lower surfaces of the wire 90 and a pair of second exposed surfaces 94B positioned on both surfaces in the lateral direction of the wire 90. Then, the wire forming machine 80 cuts the wire 90 at the center of each exposed surface 94. As a result, the above-described electrical connection part 95 is formed of a cut surface and the exposed surface 94 whose length is halved.

The formed-wire article 91 of the present embodiment is a coil, but the formed-wire article 91 may have, for example, a U shape or a V shape, or may have any shape. The electrical connection part 95 is provided only at the end part of the wire 90 constituting the formed-wire article 91; however, the present invention is not limited thereto, and the electrical connection part 95 may be disposed at any desired position. Further, the electrical connection part 95 does not need to be formed of an exposed surface 94 and a cut surface of the wire 90, and may be formed of, for example, only the exposed surface 94. The exposed surface 94 does not have to be formed of a pair of first exposed surfaces 94A and a pair of second exposed surfaces 94B, and may be formed of, for example, only either a pair of first exposed surfaces 94A or a pair of second exposed surfaces 94B.

Figure 3:
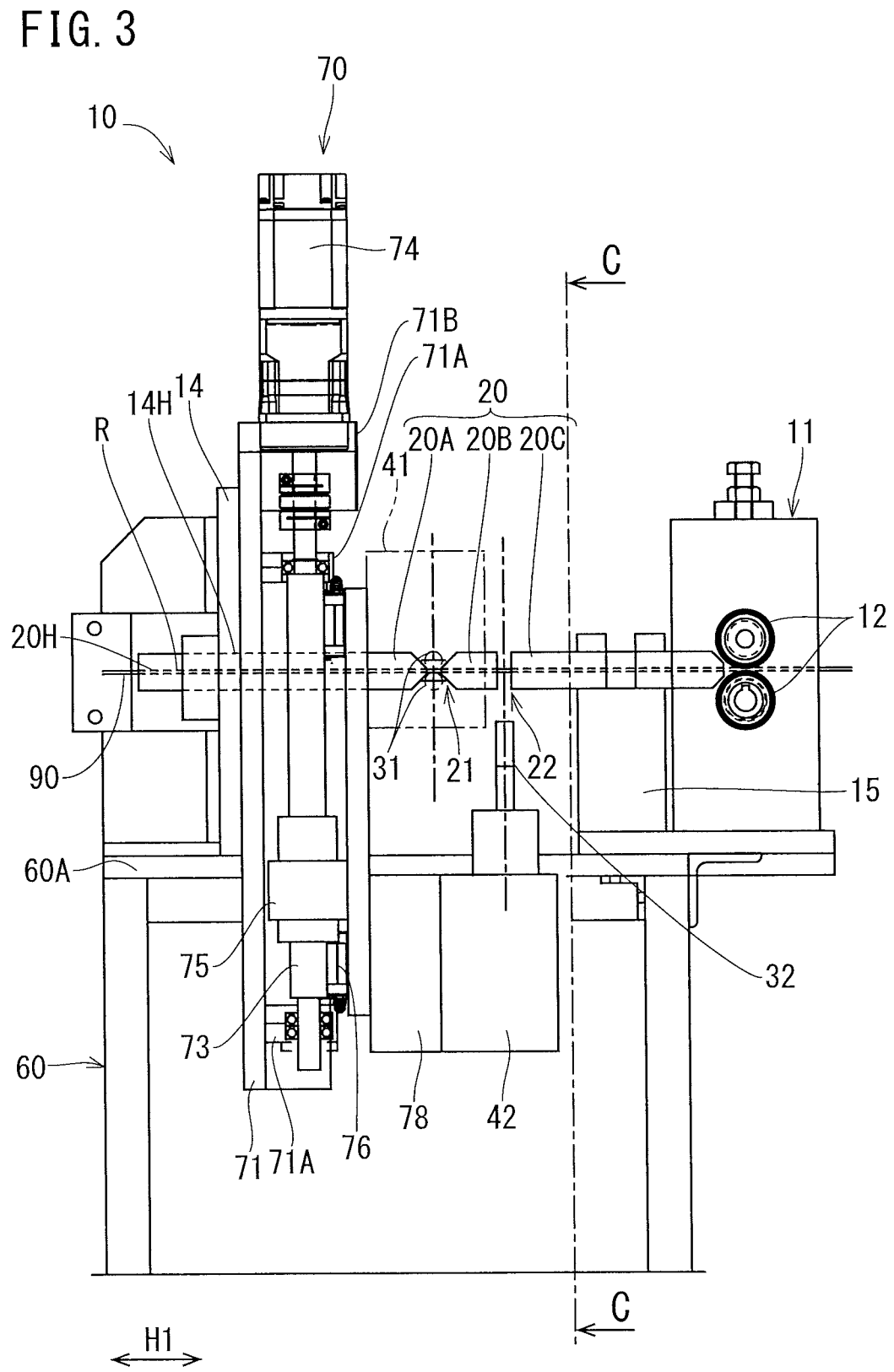
FIG. 3 is a front view of a wire coating removal device.

Hereinafter, a structure of the wire coating removal device 10 will be described. Hereinafter, with respect to the wire coating removal device 10, the side shown in FIG. 3 is referred to as a "front side", the opposite side is referred to as a "rear side", and the direction perpendicular to the paper surface of FIG. 3 is referred to as a front-rear direction. The front-rear direction is also a lateral direction in the case of the wire 90 on a wire feed path R to be described below. In FIGS. 4 to 8, the frontward direction is indicated by an arrow "F", and the rearward direction is indicated by an arrow "R".

As illustrated in FIG. 3, the wire coating removal device 10 incudes the wire feed path R in a state where the wire feed path R through which the wire 90 is fed is horizontally extended, and the wire coating removal device 10 includes a wire feeder 11 at one end part of the wire feed path R. The wire feeder 11 includes: a pair of rollers 12 facing each other in the vertical direction with the wire feed path R interposed therebetween; and a servomotor 13 (see FIG. 4) as a rotary drive source for the rollers. Then, the wire 90 is sandwiched between the pair of rollers 12, the pair of rollers 12 rotate symmetrically to feed the wire 90 in the rightward direction in FIG. 3 along the wire feed path R. Hereinafter, the direction in which the wire feed path R extends is referred to as a "wire feed direction H1".

On the upstream side in the wire feed direction H1 with respect to the wire feeder 11 there is provided a wire guide member 20. The wire guide member 20 includes a guide hole 20H penetrating therethrough in the wire feed direction H1. A cross-sectional shape of the guide hole 20H is a rectangular shape that is flat in the vertical direction so that the above-described wire 90 can snuggly pass through (see FIGS. 6A and 6B). The guide hole 20H constitutes a part of the wire feed path R, and the wire 90 is guided to the wire feeder 11 through the guide hole 20H.

The wire feeder 11 is disposed on the downstream side in the wire feed direction H1 with respect to the wire guide member 20; however, the wire feeder 11 may be disposed on the upstream side in the wire feed direction H1 with respect to the wire guide member 20 or may be disposed at a middle position, for example.

Figure 4:
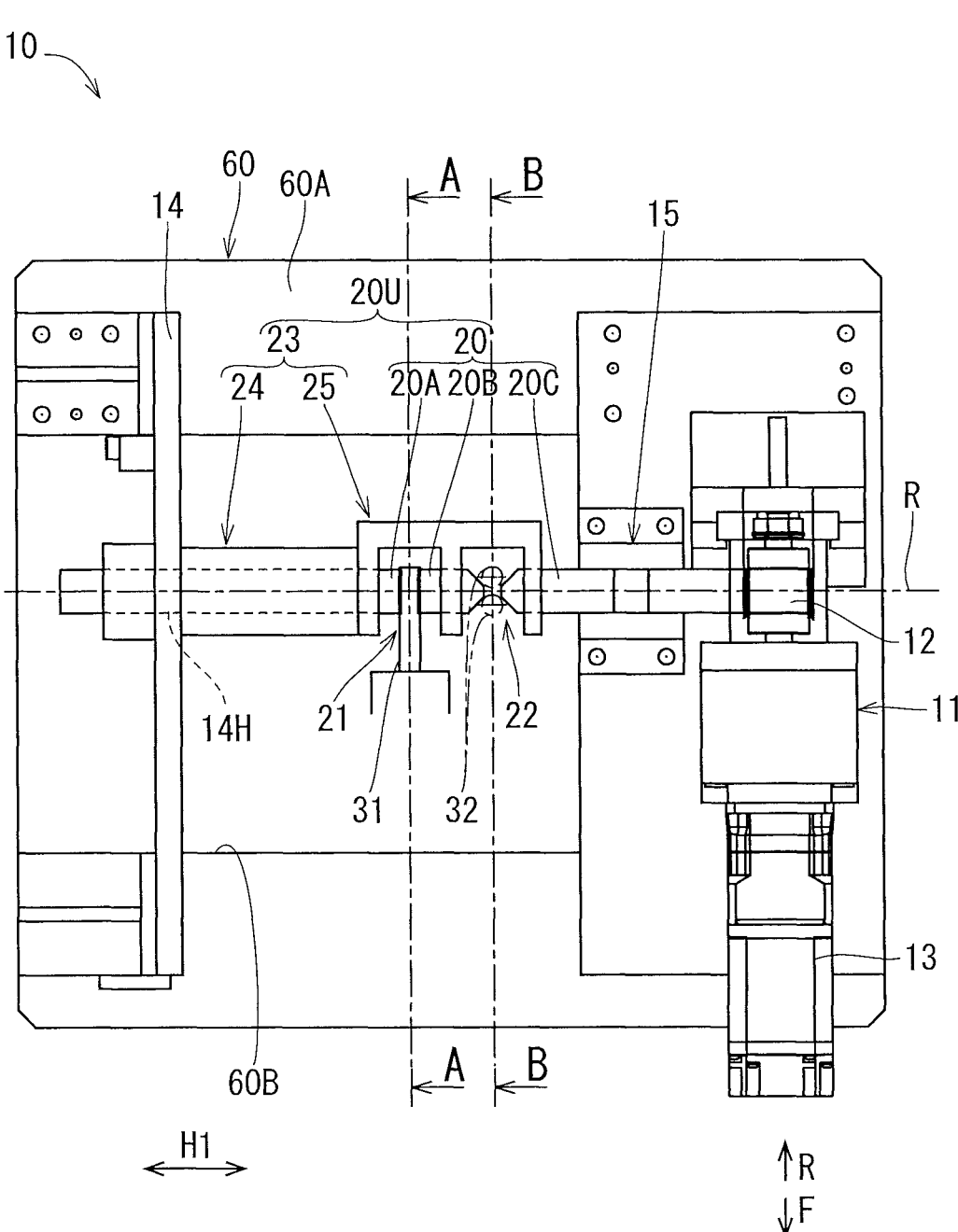
FIG. 4 is a top view of the wire coating removal device.

As illustrated in FIGS. 3 and 4, the wire guide member 20 is provided with first and second split parts 21 and 22 at two positions in the middle of the wire feed direction H1. Then, as illustrated in FIG. 3, the pair of first rotary tools 31 approach the wire 90 exposed at the first split part 21 on the upstream side, from the both sides in the vertical direction, and separate from the wire 90, and at the same time, the pair of second rotary tools 32 approach the wire 90 exposed at the second split part 22 in the downstream side, from the both sides in the lateral direction, and separate from the wire 90, as illustrated in FIG. 4. As a result, the first and second rotary tools 31 and 32 remove the coating 90B at any desired position on the wire 90.

Figure 5:
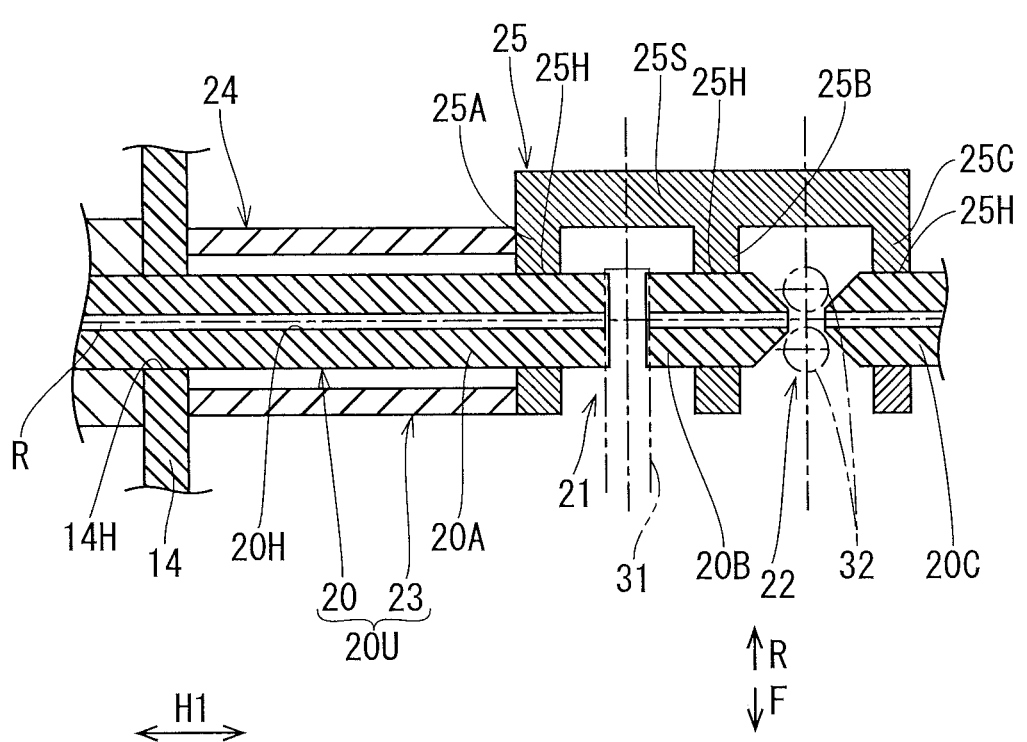
FIG. 5 is an enlarged sectional view of a periphery of a support member.

Specifically, the wire guide member 20 has a rod shape having a quadrangular cross-section as a whole, and is divided into an upstream-side guide part 20A on the upstream side with respect to the first split part 21, a middle guide part 20B between the first and second split parts 21 and 22, and a downstream-side guide part 20C on the downstream side with respect to the second split part 22 as illustrated in FIG. 5. In addition, as illustrated in FIG. 3, each end part of the upstream-side guide part 20A and the middle guide part 20B abutted with each other at the first split part 21 has a tapered shape having a pair of inclined surfaces above and below the wire feed path R (guide hole 20H), and as illustrated in FIG. 4, each end part of the middle guide part 20B and the downstream-side guide part 20C abutted with each other at the second split part 22 has a tapered shape having a pair of inclined surfaces in the front and back of the wire feed path R (guide hole 20H).

As illustrated in FIG. 4, the upstream-side guide part 20A, the middle guide part 20B, and the downstream-side guide part 20C (these are collectively referred to simply as "guide parts 20A, 20B, and 20C") are supported to be aligned on a straight line by a support member 23. A guide unit 20U including the guide parts 20A, 20B, and 20C and the support member 23 is extended between a support base 15 and a support wall 14.

Figure 6A:
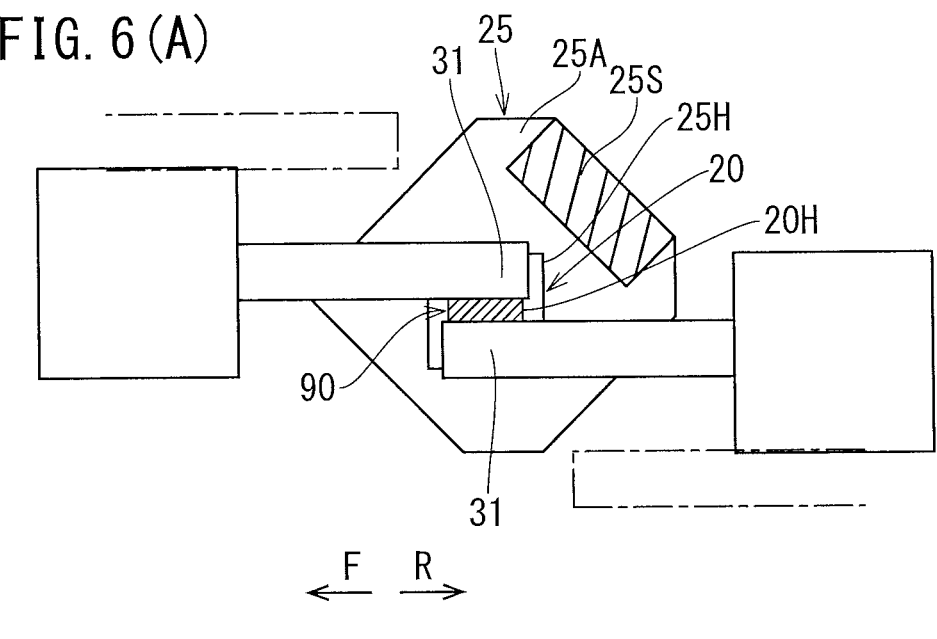
FIG. 6A is a sectional view taken along line A-A in FIG. 4.
Figure 6B:
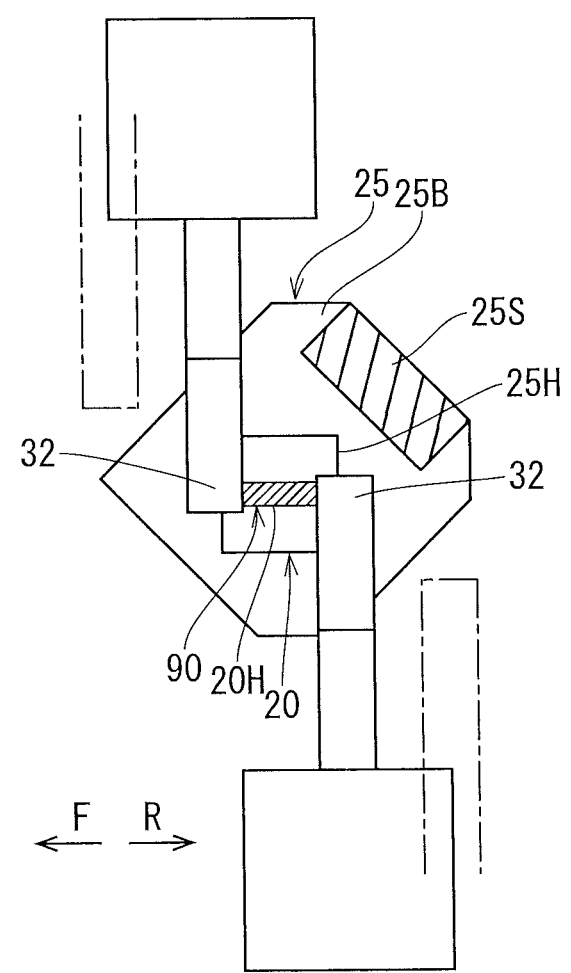
FIG. 6B is a sectional view taken along line B-B in FIG. 4.

As shown in FIG. 5, the support member 23 includes, for example, a bridge body 25 at one end of a rectangular tube body 24. The bridge body 25 has, for example, a structure in which three opposing walls 25A, 25B, and 25C arranged in the wire feed direction H1 are connected by a connection wall 25S. As illustrated in FIG. 6A, the opposing walls 25A, 25B, and 25C have, for example, a rectangular plate shape as viewed from the wire feed direction H1 with three corners of each opposing wall chamfered, and four sides of the rectangle are inclined at an angle of 45° with respect to the vertical direction. In each of the three opposing walls 25A, 25B, and 25C there is formed a fitting hole 25H having a quadrangular cross-section. Then, as illustrated in FIG. 5, a position near the end part, of the upstream-side guide part 20A, on the downstream side is fitted in the fitting hole 25H of the upstream-side opposing wall 25A on the upstream side and is fixed by welding or the like. A middle part of the middle guide part 20B is fitted in the fitting hole 25H of the central opposing wall 25B and is fixed by welding or the like. A position near the end part, of the downstream-side guide part 20C, on the upstream side is fitted in the fitting hole 25H of the downstream-side opposing wall 25C and is fixed by welding or the like.

Specifically, as illustrated in FIG. 6A, the long sides of the rectangle that is a shape of each of the opposing walls 25A, 25B, and 25C as viewed from the wire feed direction H1 are slightly longer than the short sides, and one short side is positioned on the obliquely upper rear side while the other short side is positioned on the obliquely lower front side. Both upper and lower corners of the rectangle are chamfered so as to be horizontal planes, and the corner on the rear side is chamfered so as to be a vertical plane. The connection wall 25S has a band plate shape extending in the wire feed direction H1, and is disposed such that the width direction of the connection wall 25S is parallel to the short sides, of the opposing walls 25A, 25B, and 25C, on the obliquely upper rear side. Then, the connection wall 25S is sandwiched between the adjacent opposing walls 25A and 25B and between the adjacent opposing walls 25B and 25C, and is connected to edge parts of the short sides, of the opposing walls 25A, 25B, and 25C, on the obliquely upper rear side.

As illustrated in FIG. 5, the rectangular tube body 24 extends upstream in the wire feed direction H1 from an upstream end surface of the bridge body 25. The four side surfaces of the rectangular tube body 24 are inclined at an angle of 45° with respect to the vertical direction. The rectangular tube body 24 is loosely fitted to the outside of a middle part in the longitudinal direction of the upstream-side guide part 20A, and the upstream-side guide part 20A extends further upstream from the rectangular tube body 24. On an upstream end of the rectangular tube body 24 there is provided a flange (not shown) projecting sideward.

As illustrated in FIG. 3, the above-mentioned support base 15 is positioned, on the upstream side in the wire feed direction H1, adjacent to the wire feeder 11, and is fixed to an upper surface of a support table 60 together with the wire feeder 11. The above-mentioned support wall 14 stands vertically from the upper surface of the support table 60 and has a plate shape having a main plane perpendicular to the wire feed direction H1 on the front side and rear side of the support wall 14. A quadrangular through-hole 14H is formed in the support wall 14 correspondingly to the wire guide member 20.

Further, as illustrated in FIG. 4, a portion of the upstream-side guide part 20A protruding from the rectangular tube body 24 to the upstream side in the wire feed direction H1 is fitted to the through-hole 14H of the support wall 14, and the flange (not shown) of the rectangular tube body 24 is put on the main plane of the support wall 14 and is fixed to the support wall 14 with bolts. In addition, as illustrated in FIG. 3, the downstream-side guide part 20C extends to a position just before the pair of rollers 12 in the wire feeder 11, with its middle part in the longitudinal direction being put on and fixed to an upper surface of the support base 15. A downstream-side end of the downstream-side guide part 20C has a tapered shape that has a pair of inclined surfaces above and below the wire feed path R (guide hole 20H).

The bridge body 25 of the support member 23 has a rectangular shape as viewed from the wire feed direction H1, but may have a circular shape or any other shape, for example. Similarly, the rectangular tube body 24 may be a cylindrical body or may have any shape, for example. The upstream-side guide part 20A is loosely fitted inside the rectangular tube body 24, but the present invention is not limited thereto, and the upstream-side guide part 20A may be tightly fitted, for example. The support structure of the guide parts 20A, 20B, and 20C is not limited to the support member 23 described above, and for example, a belt-shaped member may be used to connect between the upstream-side guide part 20A and the middle guide part 20B and between the middle guide part 20B and the downstream-side guide part 20C such as to avoid interference of the belt-shaped member with the pair of first rotary tools 31 and the pair of second rotary tools 32 to be described later.

Figure 7:
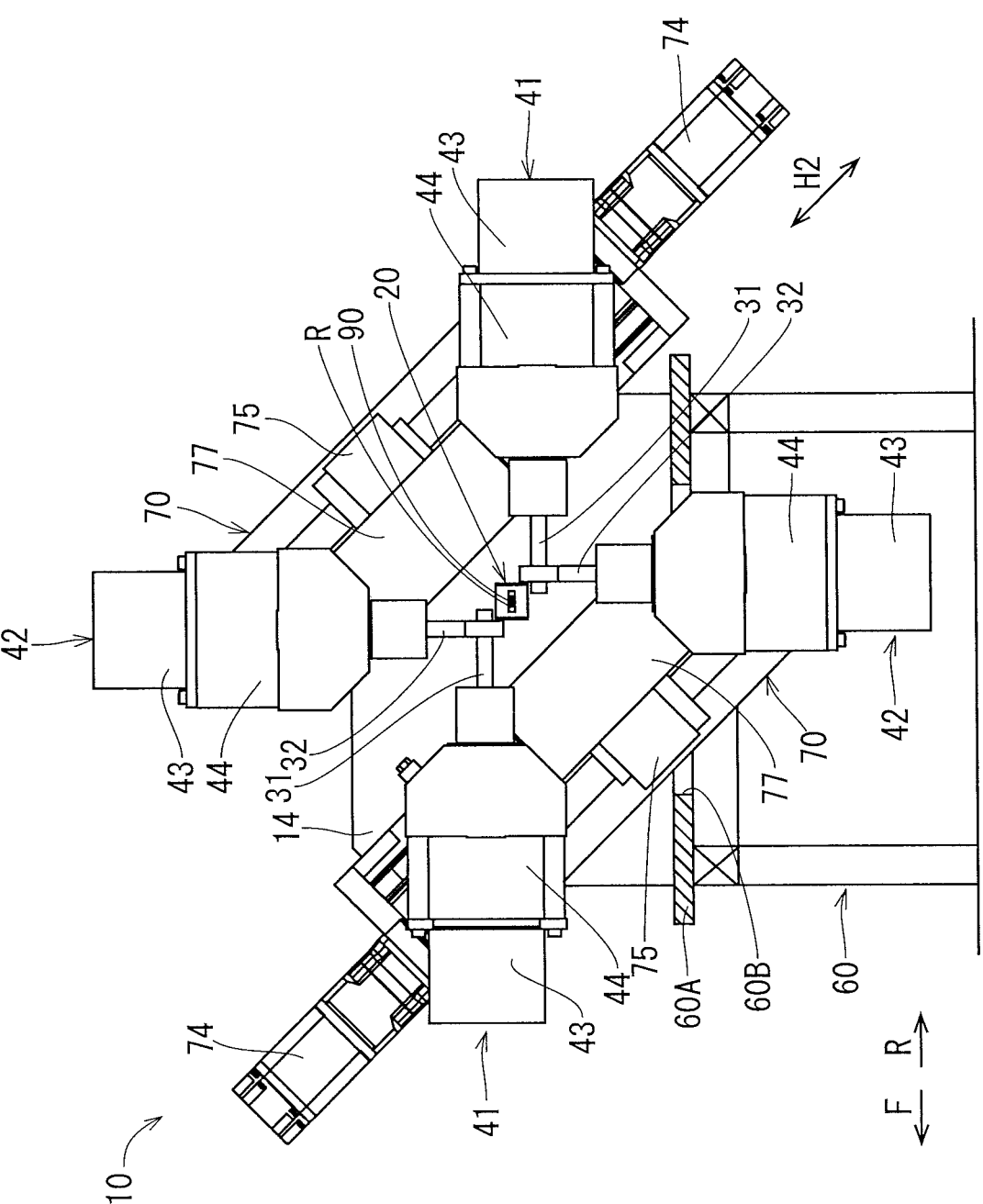
FIG. 7 is a sectional view taken along line C-C in FIG. 3.

The pair of first rotary tools 31 have a columnar shape parallel to the front-rear direction of the wire feeder 11, and are separately driven by a pair of first rotary drive mechanisms 41 illustrated in FIG. 7. Each of the first rotary drive mechanisms 41 includes a motor 43 and a support part 44 coaxially with the first rotary tool 31. The pair of first rotary drive mechanisms 41 are disposed separately on the front side and the rear side with the wire feed path R interposed therebetween so that the first rotary drive mechanisms 41 will not interfere with each other. Specifically, as for the first rotary drive mechanism 41 for the first rotary tool 31, of the pair of first rotary tools 31, on the upper side, the motor 43 and the support part 44 are disposed on the front side with respect to the first rotary tool 31; and as for the first rotary drive mechanism 41 for the first rotary tool 31 on the lower side, the motor 43 and the support part 44 are disposed on the rear side with respect to the first rotary tool 31.

The pair of second rotary tools 32 also have a columnar shape parallel to the vertical direction, and are separately driven by the pair of second rotary drive mechanisms 42 having the same structure as the first rotary drive mechanisms 41. The pair of second rotary drive mechanisms 42 are also disposed separately on the upper side and the lower side with the wire feed path R interposed therebetween so that the second rotary drive mechanisms 42 will not interfere with each other. Specifically, as for the second rotary drive mechanism 42 for second rotary tool 32, of the pair of second rotary tools 32, on the front side, the motor 43 and the support part 44 are disposed on the upper side with respect to the second rotary tool 32; and as for the second rotary drive mechanism 42 for the second rotary tool 32 on the rear side, the motor 43 and the support part 44 are disposed on the lower side with respect to the second rotary tool 32.

Each pair of the pair of first rotary drive mechanisms 41 and the pair of second rotary drive mechanisms 42 drive such that each pair of the pair of first rotary tools 31 and the pair of second rotary tools 32 rotate symmetrically with each other. Then, the first rotary tools 31 and the second rotary tools 32 press their outer peripheral surfaces against the wire 90 to remove the coating 90B.

The first tool distance changing mechanism to change a distance between the pair of first rotary tools 31 and the second tool distance changing mechanism to change a distance between the pair of second rotary tools 32 share a pair of slide mechanisms 70. When the pair of first rotary tools 31 approach each other, the pair of second rotary tools 32 separate from each other. When the pair of first rotary tools 31 separate from each other, the pair of second rotary tools 32 approach each other.

Figure 8:
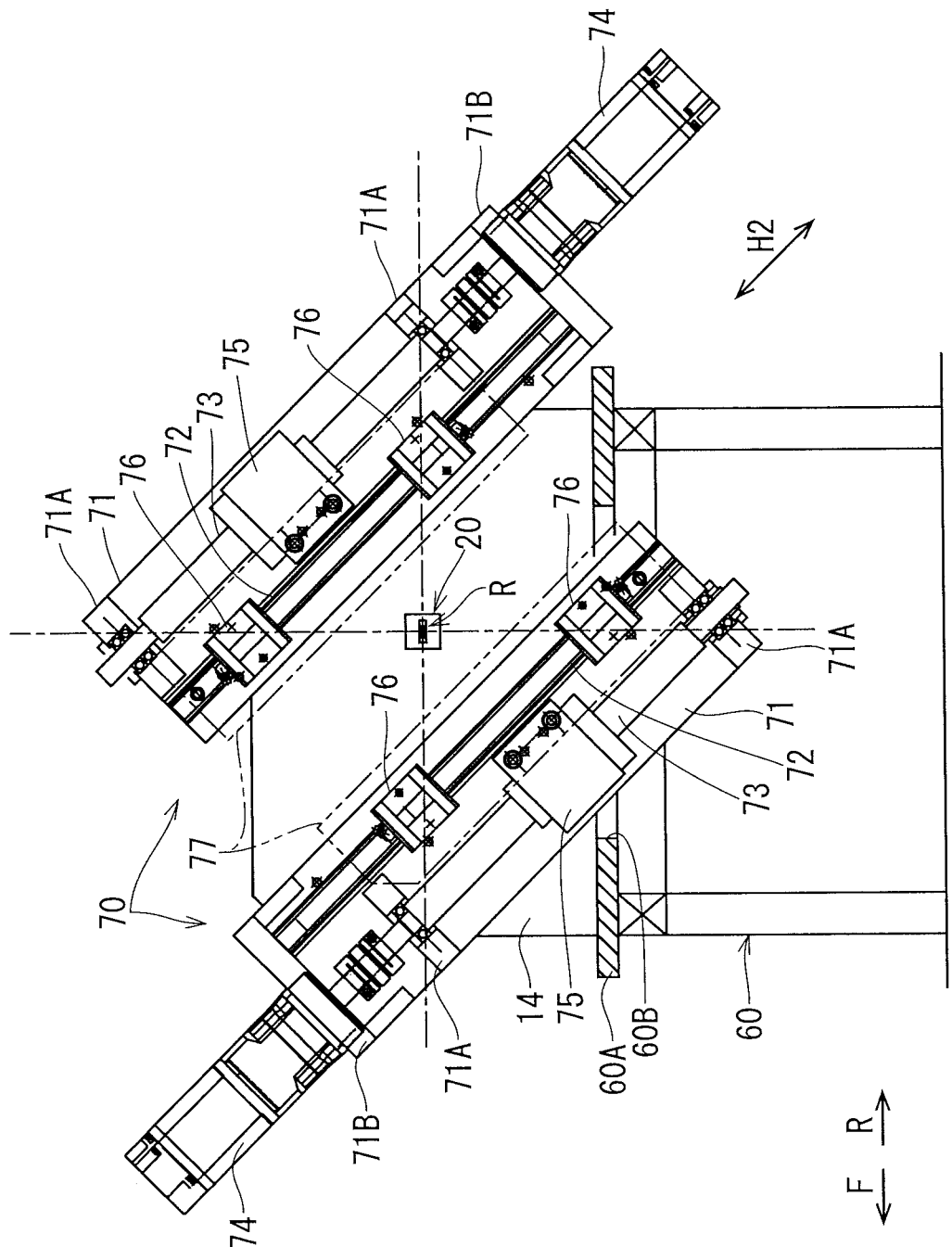
FIG. 8 is a sectional view taken along line C-C in FIG. 3 in a state where a pair of slide bases are removed.

Specifically, as illustrated in FIG. 8, the pair of slide mechanisms 70 are disposed point-symmetrically with respect to the wire feed path R, and each slide mechanism 70 includes a ball screw 73 and a guide rail 72 extending in a direction (hereinafter, referred to as a "specific inclination direction H2") inclined uphill at an angle of, for example, 45° with respect to the vertical direction and the front-rear direction, in a plane parallel to the main plane of the support wall 14. In order to support the guide rail 72 and the ball screw 73, a band plate-shaped fixing plate 71 extending in the specific inclination direction H2 is put on and fixed to the main plane, of the support wall 14, facing the support base 15. The guide rail 72 is fixed to the fixing plate 71, on the side closer to the wire feed path R in the main plane of the support wall 14. Further, on the side, of the main plane of the fixing plate 71, farther from the wire feed path R, there are provided a pair of projecting walls 71A on one end part and near the other end of the fixing plate 71, in the specific inclination direction H2. Both end parts of the ball screw 73 are rotatably supported by the pair of projecting walls 71A. In addition, a motor support projecting wall 71B protrudes from the other end part of the fixing plate 71. One end part of a speed reducer-equipped servomotor 74 is supported by the fixing plate 71, and a rotation output shaft of the speed reducer-equipped servomotor 74 and the ball screw 73 are connected to each other to be integrally rotatably. Further, a slide base 77 is fixed to a ball nut 75 screw-engaged with the ball screw 73 and to a pair of sliders 76 that are slidably engaged with the guide rail 72 and are positioned on both sides of the ball nut 75. Then, the slide base 77 is moved to any desired slide position by the speed reducer-equipped servomotor 74.

In the present embodiment, the speed reducer-equipped servomotor 74 of the slide mechanism 70 on the front side with respect to the wire guide member 20 (hereinafter, simply referred to as a "front-side slide mechanism 70") is positioned at an upper end of the fixing plate 71, and the speed reducer-equipped servomotor 74 of the slide mechanism 70 on the rear side with respect to the wire guide member 20 (hereinafter, simply referred to as a "rear-side slide mechanism 70") is positioned at a lower end of the fixing plate 71. Further, in a top panel 60A of the support table 60 there is formed a through-hole 60B that receives a lower end part of the front-side slide mechanism 70.

In the present embodiment, the specific inclination direction H2 corresponds to a "third direction" in the claims, the vertical direction corresponds to a "first direction" in the claims, and the front-rear direction corresponds to a "second direction" in the claims.

Each slide base 77 has a band plate shape extending in the specific inclination direction H2 and parallel to the corresponding fixing plate 71. On the upper end part of the slide base 77 on the front side, the motor 43 and the support part 44 of the first rotary drive mechanism 41 on the upper side are fixed, and on the lower end part of such slide base 77, the motor 43 and the support part 44 of the second rotary drive mechanism 42 on the rear side are fixed via a base member 78 (see FIG. 3). On the other hand, the motor 43 and the support part 44 of the first rotary drive mechanism 41 on the lower side are fixed to the lower end part of the slide base 77 on the rear side, and the motor 43 and the support part 44 of the second rotary drive mechanism 42 on the front side are fixed to the upper end part via the base member 78.

Figure 10:
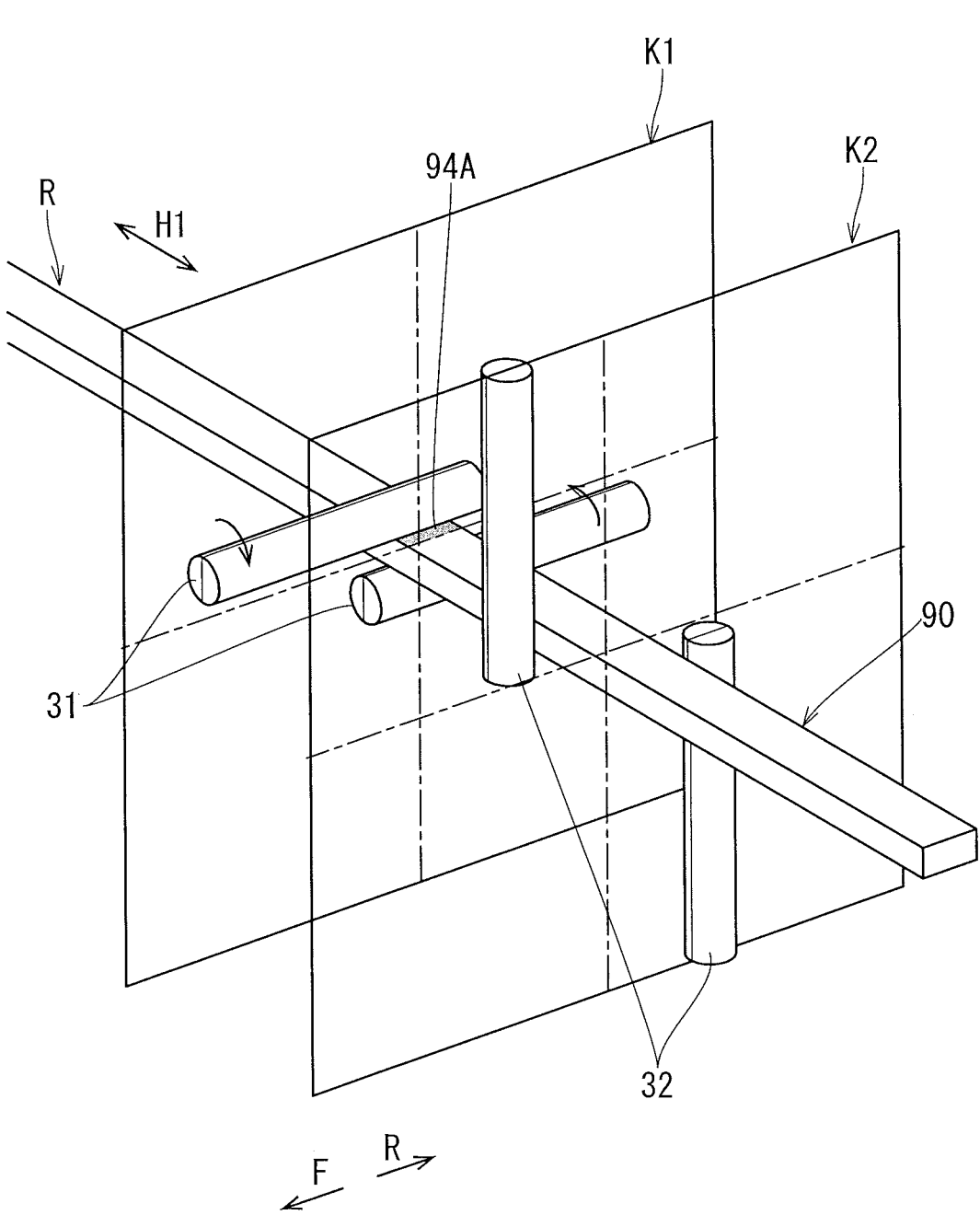
FIG. 10 is a perspective view of a state in which a pair of first rotary tools are close to a wire and a pair of second rotary tools are apart from the wire.
Figure 11:
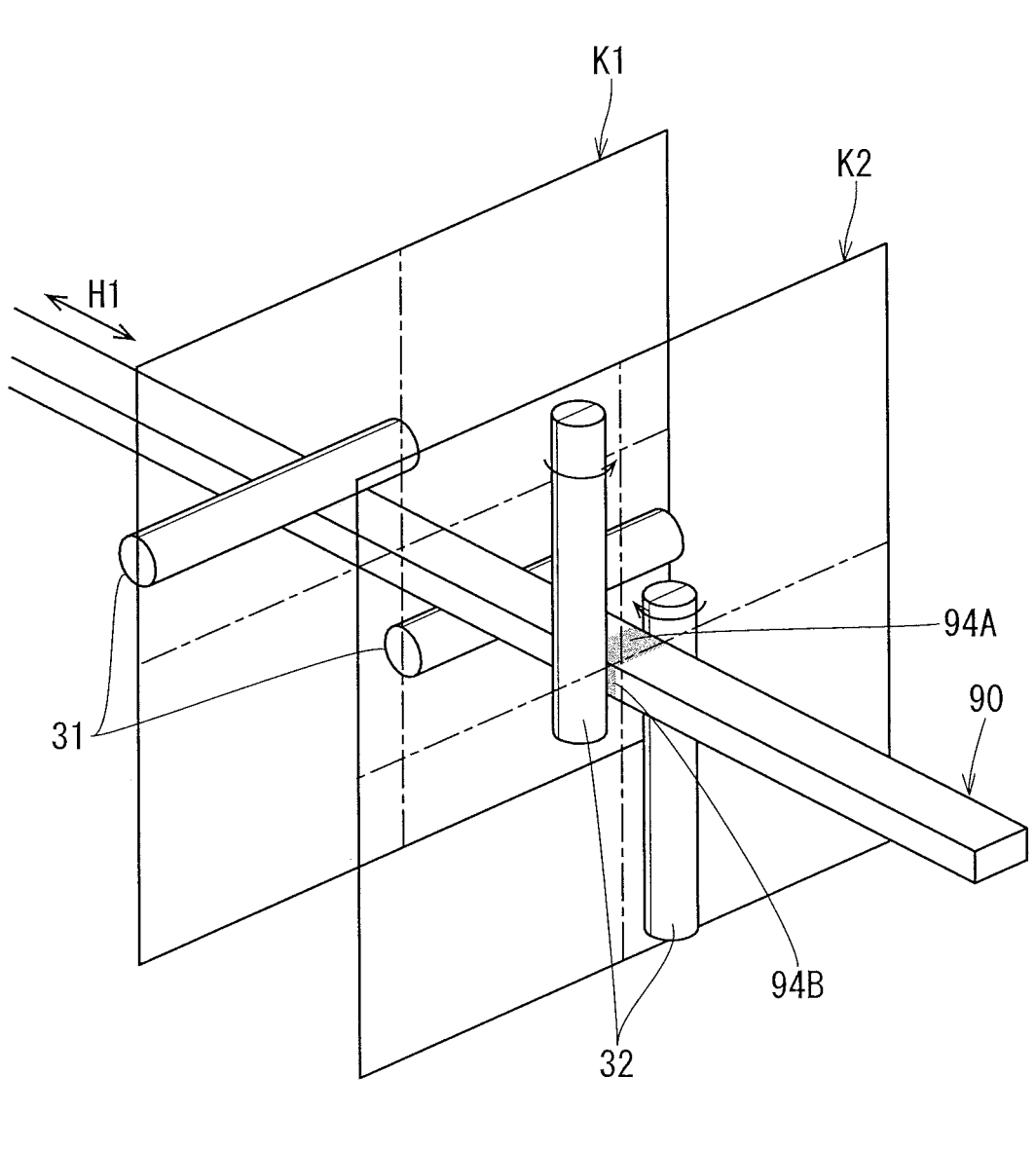
FIG. 11 is a perspective view of a state in which the pair of first rotary tools are apart from a wire and the pair of second rotary tools are close to the wire.

When the slide base 77 on the front side moves obliquely downward and the slide base 77 on the rear side moves obliquely upward, the pair of first rotary tools 31 approach each other in the vertical direction, and the pair of second rotary tools 32 separate from each other in the front-rear direction, as shown in FIG. 10. When the slide base 77 on the front side moves obliquely upward and the rear slide base 77 moves obliquely downward, the pair of first rotary tools 31 separate from each other in the vertical direction, and the pair of second rotary tools 32 approach each other in the front-rear direction, as shown in FIG. 11. Note that, in FIGS. 10 and 11, an imaginary plane on which the pair of first rotary tools 31 move in parallel is illustrated as a plane K1, and an imaginary plane on which the pair of second rotary tools 32 move in parallel is illustrated as a plane K2.

When the pair of first rotary tools 31 are approaching each other or separating from each other in the vertical direction, the pair of first rotary tools 31 are approaching or separating also in the front-rear direction. The same applies to the pair of second rotary tools 32. In addition, the first rotary tool 31 on the upper side and the second rotary tool 32 on the rear side move so as to advance to or retreat from a space between the connection wall 25S of the bridge body 25 and the wire guide member 20 (see FIGS. 6A and 6B).

In the above embodiment, one of the first rotary drive mechanisms 41 and one of the second rotary drive mechanisms 42 are fixed to the common slide base 77 and move as a set, but the present invention is not limited to this configuration and may be configured as follows. Specifically, for example, the following configuration may be employed. On one slider 76 of the pair of sliders 76 provided on the guide rail 72, the slide base to which only the first rotary drive mechanism 41 is fixed is fixed; and on the other slider 76, the slide base to which only the second rotary drive mechanism 42 is fixed is fixed, where the two slide bases are moved by separate drive sources. The same applies to the other first rotary drive mechanism 41 and the other second rotary drive mechanism 42.

In the above embodiment, the slide bases 77 are each slid by the corresponding ball screw 73 and ball nut 75. However, the slide bases 77 may have any structure as long as the slide bases can be moved, and, for example, the slide bases may each be slid by a rack-and-pinion mechanism.

In the above embodiment, the pair of slide bases 77 are configured to move in the direction inclined at an angle of 45° with respect to the vertical direction and the front-rear direction in a plane parallel to the main plane of the support wall 14, but the angle is not limited to 45°, and the angle may be appropriately changed in accordance with, for example, the shape of the wire 90 or the inclination of the pair of rotary tools 31 and the pair of rotary tools 32.

Figure 9:
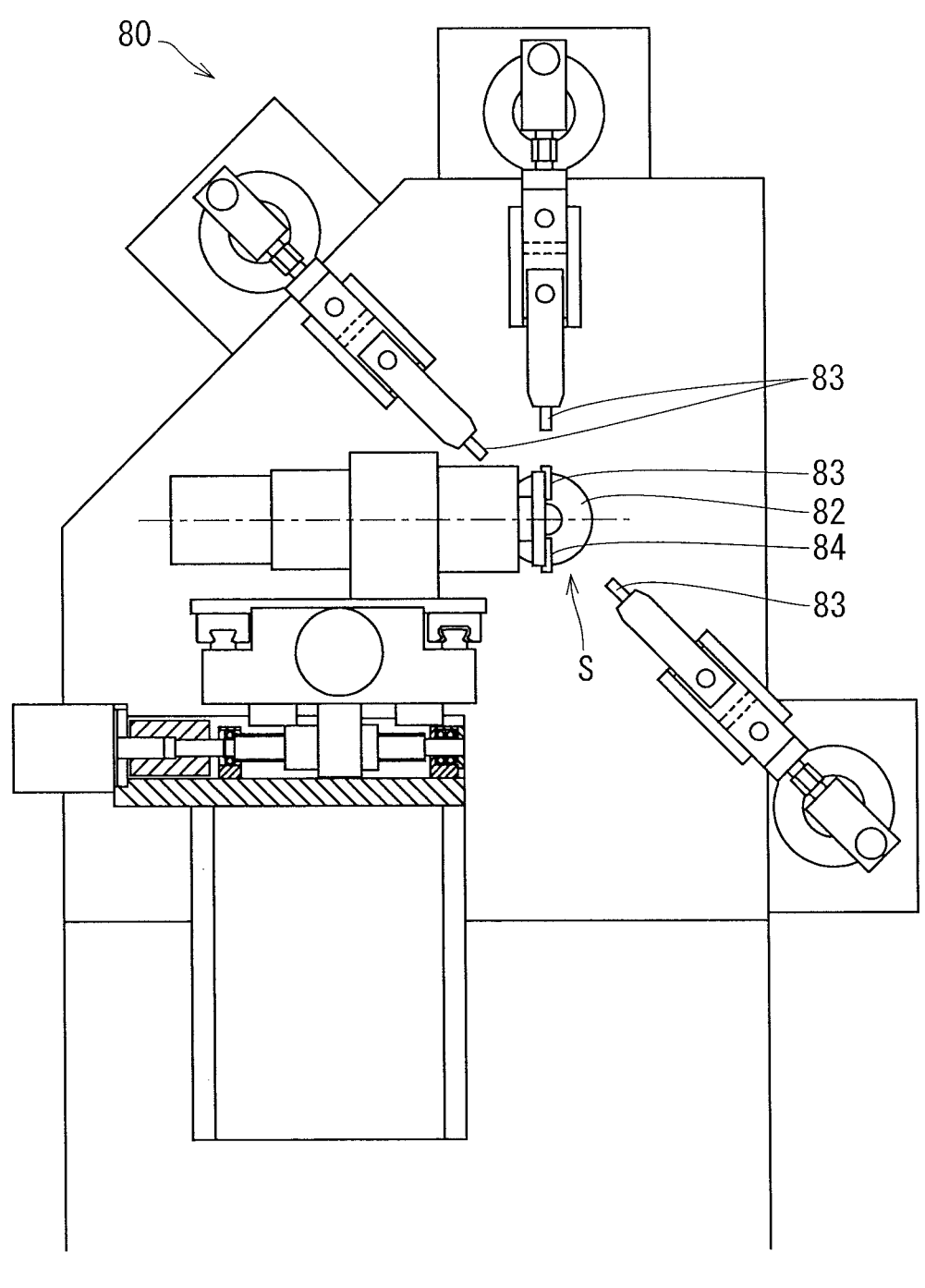
FIG. 9 is a side view of a wire forming machine.

The structure of the wire coating removal device 10 has been described above. Next, the structure of the wire forming machine 80 will be described. As illustrated in FIG. 1, the wire forming machine 80 also includes a wire feeder 81 capable of feeding the wire 90. Then, the wire 90 fed from the wire feeder 81 is inserted into a guide hole of a quill 82 and is fed to a working stage S. As illustrated in FIG. 9, the working stage S includes: a plurality of forming tools 83 capable of nipping the wire 90 and performing bend forming or the like on the wire 90; and a cutting tool 84 capable of cutting the wire 90. As a result, the formed-wire articles 91 described above are sequentially formed.

In the present embodiment, the wire feeder 11 of the wire coating removal device 10 and the wire feeder 81 of the wire forming machine 80 have the wire feed paths R on the same straight line. However, the present invention is not limited to this configuration, and the wire feed path R of the wire coating removal device 10 and the wire feed path R of the wire forming machine 80 may be displaced upward and downward, or may be directed in different directions as viewed from above.

The configuration of the wire forming system 100 has been described above. Next, actions and effects of the wire coating removal device 10 and the wire forming system 100 will be described. In a state where the wire forming system 100 is stopped, the pair of first rotary tools 31 and the pair of second rotary tools 32 in the wire coating removal device 10 are both disposed at origin positions that are apart from the wire feed path R. In this state, the wire 90 is inserted into the wire feed path R of the wire coating removal device 10, and the tip of the wire 90 is inserted into the pair of rollers 12 of the wire feeder 11. Then, when the wire coating removal device 10 is activated, the pair of first rotary tools 31 approach, and come into contact with both the upper and lower surfaces of the wire 90 at the first split part 21 of the wire guide member 20 (see FIGS. 6A and 10). At this time, the pair of second rotary tools 32 are apart from each other and are away from the wire 90 in the lateral direction. In this state, the wire feeder 11 feeds the wire 90 by a predetermined length. As a result, the coating 90B of a predetermined length is removed from both upper and lower surfaces of the wire 90, and a pair of first exposed surfaces 94A are formed.

After the pair of first exposed surfaces 94A are formed, the pair of first rotary tools 31 separate from the wire 90, and the pair of second rotary tools 32 are approaching each other, thereby approaching the wire 90. Then, when one end of the first exposed surfaces 94A reaches the second split part 22 of the wire guide member 20, the pair of second rotary tools 32 come into contact with both surfaces, of the wire 90, in the lateral direction (see FIGS. 6B and 11). At this time, the pair of first rotary tools 31 are away from each other and is apart upward and downward from the wire 90. In this state, the wire feeder 11 feeds the wire 90 by a predetermined length. As a result, the coating 90B of the predetermined length is removed from the both surfaces, of the wire 90, in the lateral direction, and a pair of second exposed surfaces 94B are formed. As a result, the exposed surface 94 including the pair of first exposed surfaces 94A and the pair of second exposed surfaces 94B is formed on the wire 90. When the pair of second exposed surfaces 94B are formed, the pair of first rotary tools 31 and the pair of second rotary tools 32 return to the origin positions. Then, the wire coating removal device 10 repeats the above operation so that the exposed surfaces 94 are formed on the wire 90 at a predetermined distance interval LO.

When the wire 90 extends from the wire coating removal device 10 toward the wire forming machine 80 by a predetermined length, the wire 90 is taken into the wire feeder 81 of the wire forming machine 80, and the wire 90 is made to sag between the wire coating removal device 10 and the wire forming machine 80 as illustrated in FIG. 1. Specifically, setting is made to dispose, between the wire feeders 11 and 81, the wire 90 having a length longer than a distance between the wire coating removal device 10 and the wire forming machine 80, by the development length (that is, the predetermined distance interval LO described above) of at least one formed-wire article 91. Then, the wire coating removal device 10 and the wire forming machine 80 operate in synchronization with each other such that the following two periods are the same: a period of one cycle in which the wire coating removal device 10 forms the exposed surface 94 on the wire 90 having a length for one formed-wire article 91, and feeds the wire 90; and a period of one cycle in which the wire forming machine 80 forms one formed-wire article 91. As a result, the wire coating removal device 10 and the wire forming machine 80 repeat certain operations, thereby sequentially producing the formed-wire articles 91. Here, the wire coating removal device 10 and the wire forming machine 80 respectively include the wire feeders 11 and 81, and the wire 90 sags between the wire coating removal device 10 and the wire forming machine 80; therefore, one of the wire coating removal device 10 and the wire forming machine 80 does not have to wait for the other during one cycle, and the wire coating removal device 10 and the wire forming machine 80 operate smoothly.

As described above, the wire coating removal device 10 of the present embodiment makes it possible to form the pair of first exposed surfaces 94A directed in the vertical direction (first direction) and the pair of second exposed surfaces 94B directed in the front-rear direction (second direction) of the wire coating removal device 10, at any desired position in the longitudinal direction of the wire 90. That is, the wire coating removal device 10 of the present embodiment makes it possible to form the exposed surface 94 on the wire 90, which formation of the exposed surface 94 is impossible with the conventional wire coating removal device. The wire 90 is supported by the wire guide member 20 at both sides of a part to be worked and is therefore stabilized, so that the working accuracy is improved. The wire 90 and the guide hole 20H of the wire guide member 20 through which the wire 90 passes have a quadrangular cross-section, so that the wire 90 is prevented from rotating and twisting about the axis at the time of working, thereby improving the working accuracy. The wire coating removal device 10 itself includes the wire feeder 11 that feeds the wire 90, and the positional accuracy, of a part to be worked, in the longitudinal direction of the wire 90 is therefore improved. In the wire forming system 100 of the present embodiment, since the wire coating removal device 10 and the wire forming machine 80 separately include the wire feeders 11 and 81, the wire 90 is made to sag between the wire coating removal device 10 and the wire forming machine 80 so that it is possible to eliminate an operation in which one of the wire coating removal device 10 and the wire forming machine 80 waits for the other, whereby it is possible to efficiently produce the formed-wire article 91 from the wire 90.

Meanwhile, the following configuration can be used: the first tool distance changing mechanism to change the distance between the pair of first rotary tools 31 in the first direction (specifically, in the vertical direction) and the second tool distance changing mechanism to change the distance between the pair of second rotary tools 32 in the second direction (specifically, in the front-rear direction) have a structure (hereinafter, referred to as a "simple movement structure") in which the pair of first rotary drive mechanisms 41 to drive the first rotary tools 31 are moved in parallel to the first direction, and the pair of second rotary drive mechanisms 42 to drive the second rotary tools 32 are moved in parallel to the second direction. However, in such a simple movement structure, in order to avoid mutual interference between the pair of first rotary drive mechanisms 41 and between the pair of second rotary drive mechanisms 42, sizes of the first rotary drive mechanisms 41 and the second rotary drive mechanisms 42 need to be strictly limited. On the other hand, as in the structure of the present embodiment, when the first tool distance changing mechanism and the second tool distance changing mechanism share the pair of slide mechanisms 70. When one of the first rotary tools 31 and one of the second rotary tools 32 are moved as a set and the other of the first rotary tools 31 and the other of the second rotary tools 32 are moved as a set, the interference between the first rotary drive mechanisms 41 and between the second rotary drive mechanisms 42 can be easily avoided, and the limitations on the sizes and structures of the mechanisms are relaxed.

In the present embodiment, the pair of first exposed surfaces 94A and the pair of second exposed surfaces 94B are disposed at the same position in the longitudinal direction of the wire 90, but may be disposed at positions apart from each other. In the present embodiment, the first direction (vertical direction) in which the pair of first rotary tools 31 approach and separate to form the pair of first exposed surfaces 94A and the direction (front-rear direction) in which the pair of second rotary tools 32 approach and separate to form the pair of second exposed surfaces 94B are perpendicular to each other, but may intersect at an angle other than 90 degrees.

The pair of first rotary tools 31 and the pair of second rotary tools 32 may be each rotationally driven by a common rotary drive mechanism. As for a configuration in which the pair of first rotary tools 31 are rotationally driven by a common rotary drive mechanism, a configuration is considered in which the pair of first rotary tools 31 are rotated centering on a common rotating body (gear or pulley). The same applies to the second tool distance changing mechanism to change the distance between the pair of second rotary tools 32.

In the present embodiment, a description has been made taking as an example the exposed surface 94 including the pair of first exposed surfaces 94A and the pair of second exposed surfaces 94B. However, for example, the exposed surface may be formed of only either the pair of first exposed surfaces 94A or the pair of second exposed surfaces 94B. In other words, the wire coating removal device 10 of the present embodiment makes it possible to form a plurality of types of exposed surfaces as follows: the exposed surface 94 including the pair of first exposed surfaces 94A and the pair of second exposed surfaces 94B; the exposed surface including only the pair of first exposed surfaces 94A; and the exposed surface including only the pair of second exposed surfaces 94B.

Second Embodiment

Figure 12:
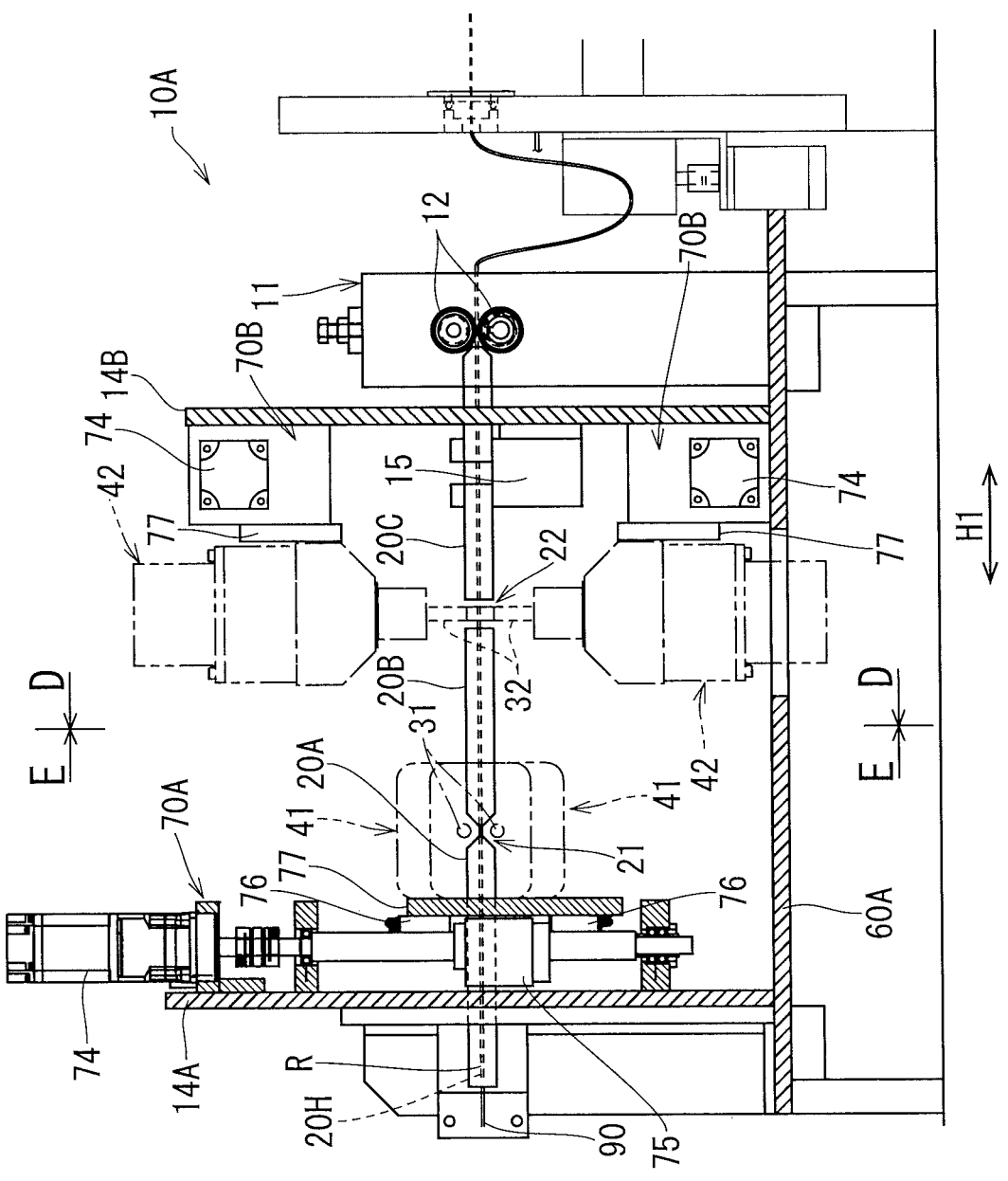
FIG. 12 is a front view of a wire coating removal device according to a second embodiment.
Figure 13:
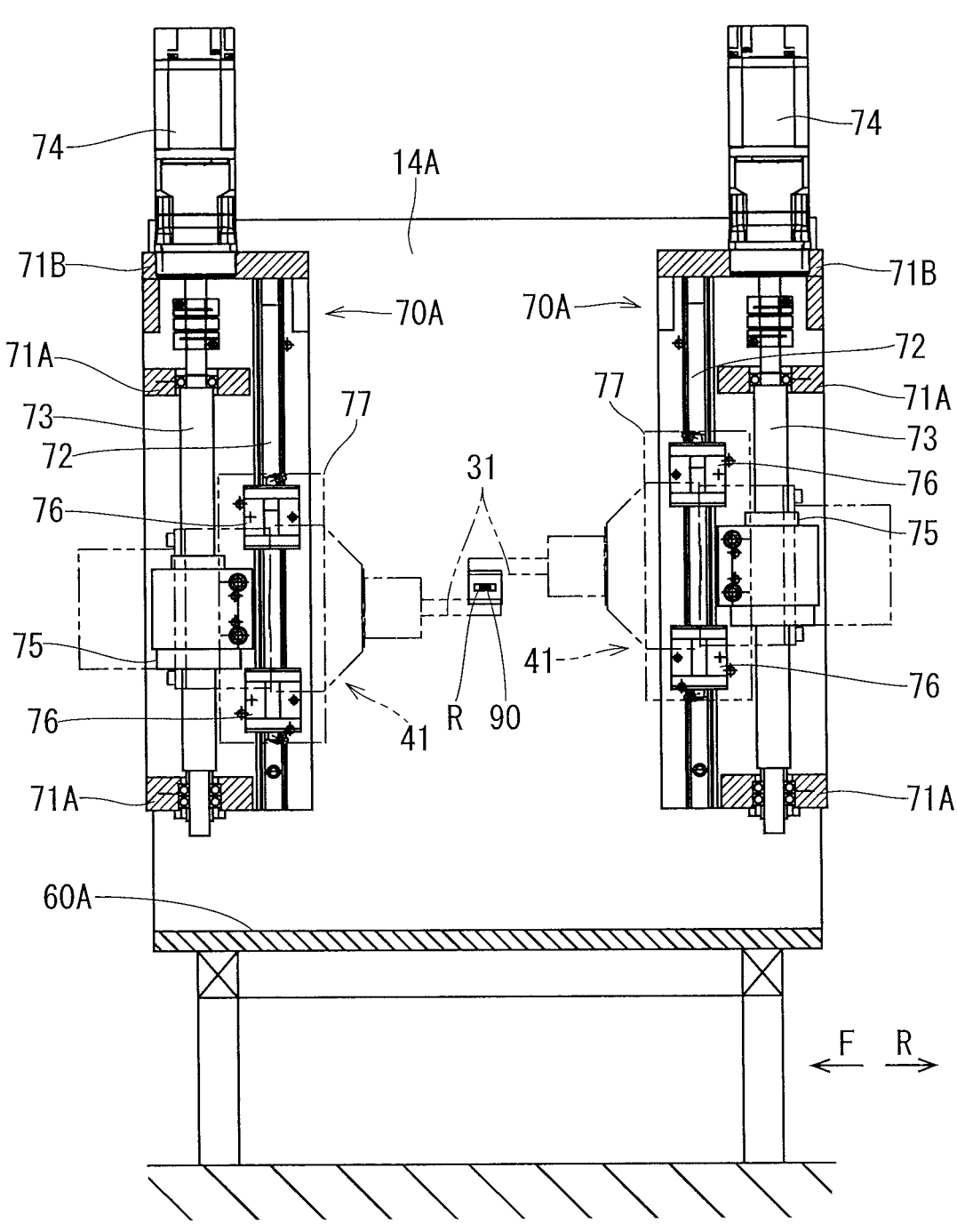
FIG. 13 is a sectional view taken along line D-D of FIG. 12.
Figure 14:
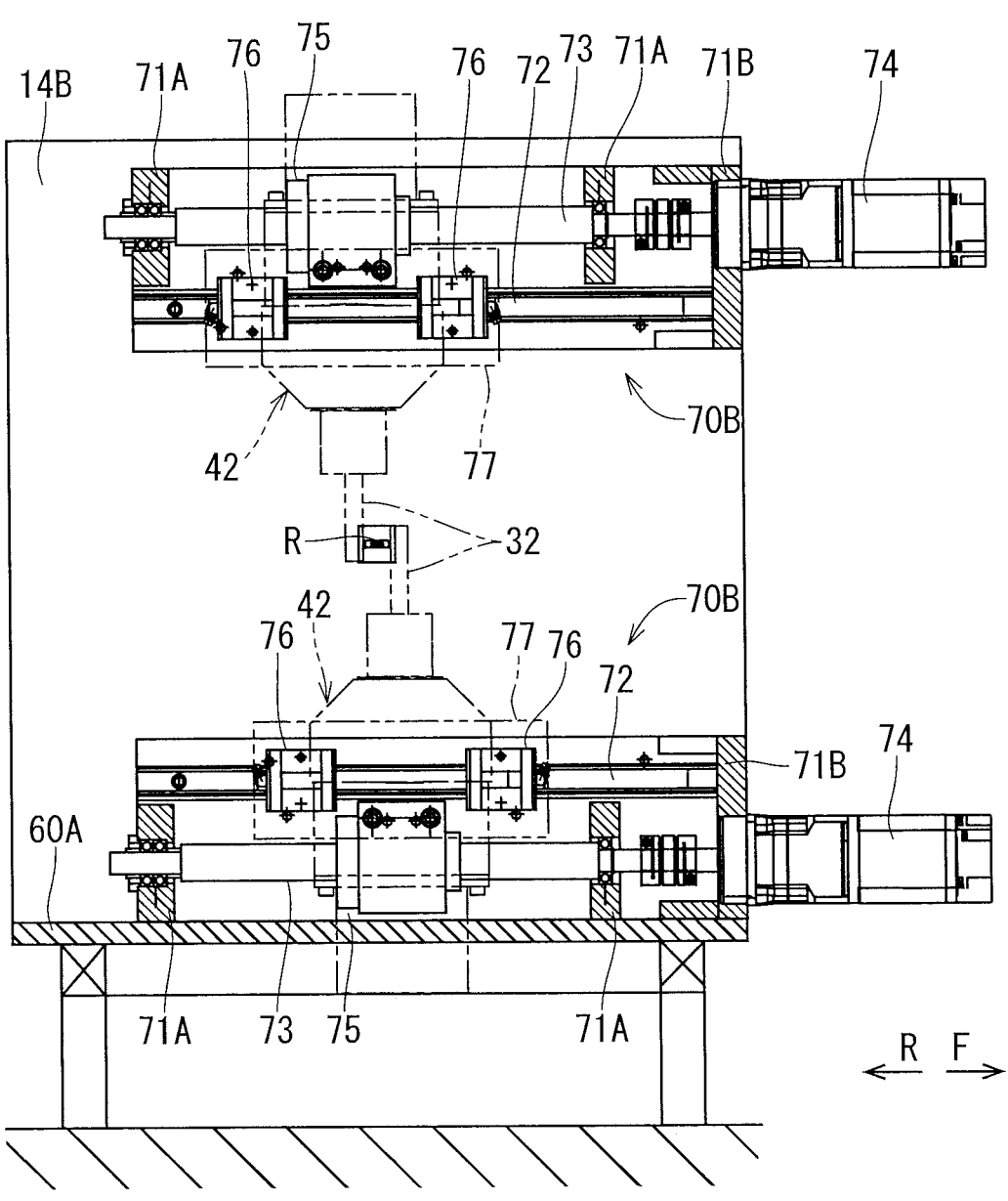
FIG. 14 is a sectional view taken along line E-E of FIG. 12.

Hereinafter, a wire coating removal device 10A of the present embodiment illustrated in FIGS. 12 to 14 will be described. The wire coating removal device 10A includes a pair of support walls 14A and 14B standing upright from a top panel 60A and facing each other in a wire feed direction H1. As illustrated in FIG. 13, on an opposing surface of the support wall 14A on the upstream side, which opposing surface is one of opposing surfaces of the pair of support walls 14A and 14B, there are provided a pair of slide mechanisms 70A as a first tool distance changing mechanism to change a distance between a pair of first rotary tools 31. As illustrated in FIG. 14, on an opposing surface of the support wall 14B on the downstream side there are provided a pair of slide mechanisms 70B as a second tool distance changing mechanism to change a distance between a pair of second rotary tools 32. The slide mechanisms 70A and 70B have the same basic structure as the slide mechanisms 70 of the first embodiment, and parts having the same structure as in the first embodiment are denoted by the same reference numerals as in the first embodiment.

As illustrated in FIG. 13, on the opposing surface of the support wall 14A on the upstream side, the pair of slide mechanisms 70A are aligned in the front-rear direction with the wire feed path R interposed therebetween, so that the slide bases 77 of the slide mechanisms 70A slide vertically. The slide bases 77 of the slide mechanisms 70A are each attached with a first rotary drive mechanism 41 to rotationally drive the corresponding first rotary tool 31.

As illustrated in FIG. 14, on the opposing surface of the support wall 14B on the downstream side, the pair of slide mechanisms 70B are aligned in the vertical direction with the wire feed path R interposed therebetween, so that the slide bases 77 of the slide mechanisms 70B slide in the front-rear direction. The slide bases 77 of the slide mechanism 70B are each attached with a second rotary drive mechanism 42 to rotationally drive the corresponding second rotary tool 32.

The wire coating removal device 10A of the present embodiment is the same as the wire coating removal device 10 of the first embodiment except the above-described configuration, and performs working on the wire 90 in the same manner as the wire coating removal device 10 of the first embodiment. In the simple movement structure as in the present embodiment, in order to avoid mutual interference between the pair of first rotary drive mechanisms and between the pair of second rotary drive mechanisms, the sizes and structures of the first rotary drive mechanism and the second rotary drive mechanism are strictly limited; however, in the structure of the first embodiment, such limitation is relaxed.

Other Embodiments (1) In the first and second embodiments, the first tool distance changing mechanism to change the distance between the pair of first rotary tools 31 includes the pair of slide mechanisms 70 (or, the pair of slide mechanisms 70A), and the pair of slide mechanisms 70 are driven by separate drive sources (the speed reducer-equipped servomotors 74). However, the pair of slide mechanisms 70 or 70A may be driven by a common drive source. The same applies to the second tool distance changing mechanism to change the distance between the pair of second rotary tools 32.

Figure 15:
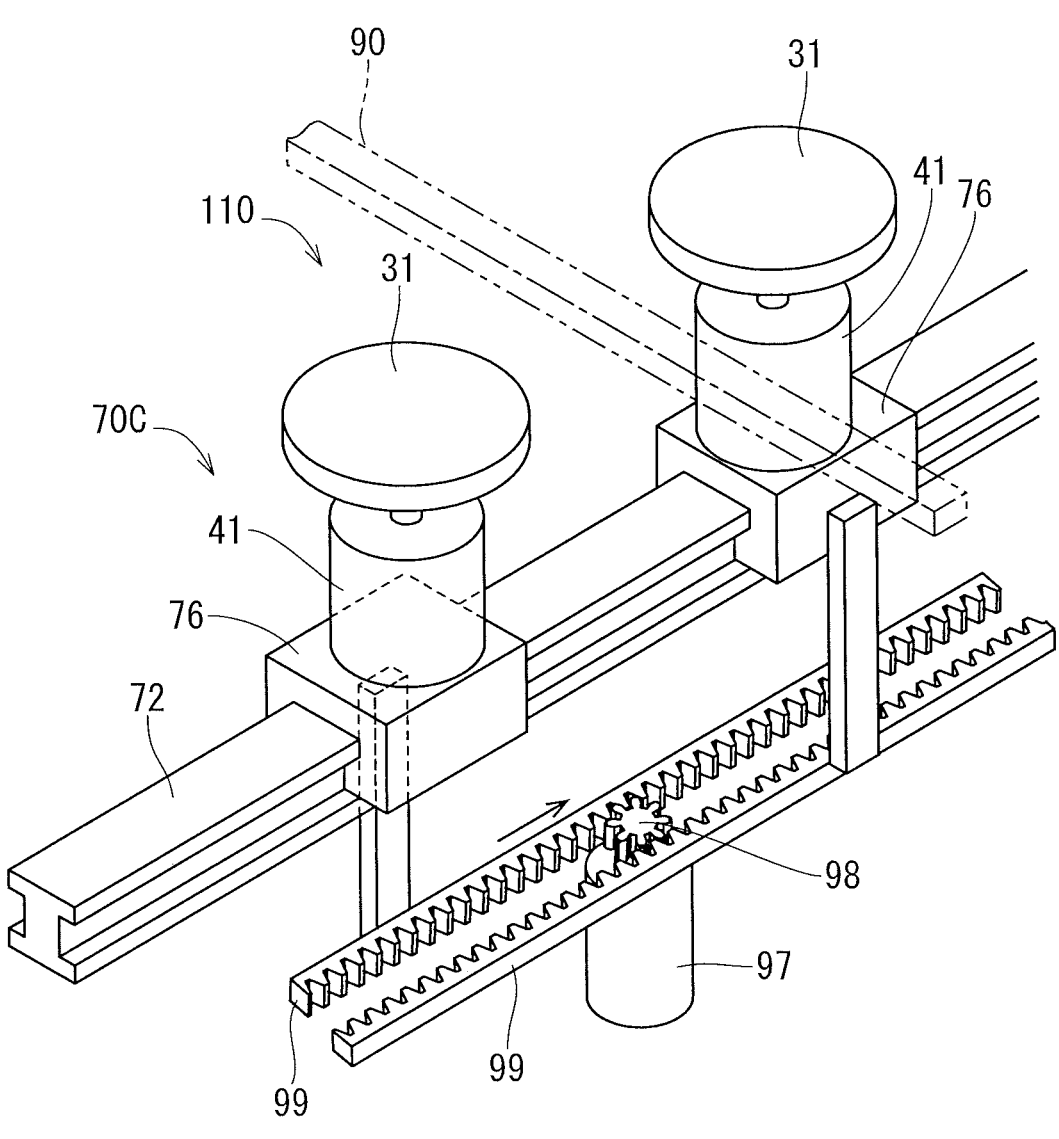
FIG. 15 is a perspective view of a first tool distance changing mechanism according to a modification.

(2) Specifically, as in a first tool distance changing mechanism 110 illustrated in FIG. 15, for example, the following configuration may be employed. A first rotary drive mechanism 41 to drive a pair of first rotary tools 31 is attached to a pair of sliders 76 slidingly engaged with a common guide rail 72. A pair of racks 99 fixed to respective ones of the pair of sliders 76 and extending in parallel to the guide rail 72 are disposed to face each other. A pinion 98 is provided to be sandwiched by and meshed with the pair of racks 99, and the pinion 98 is rotatably driven by a motor 97. The same applies to the second tool distance changing mechanism.

Figure 16:
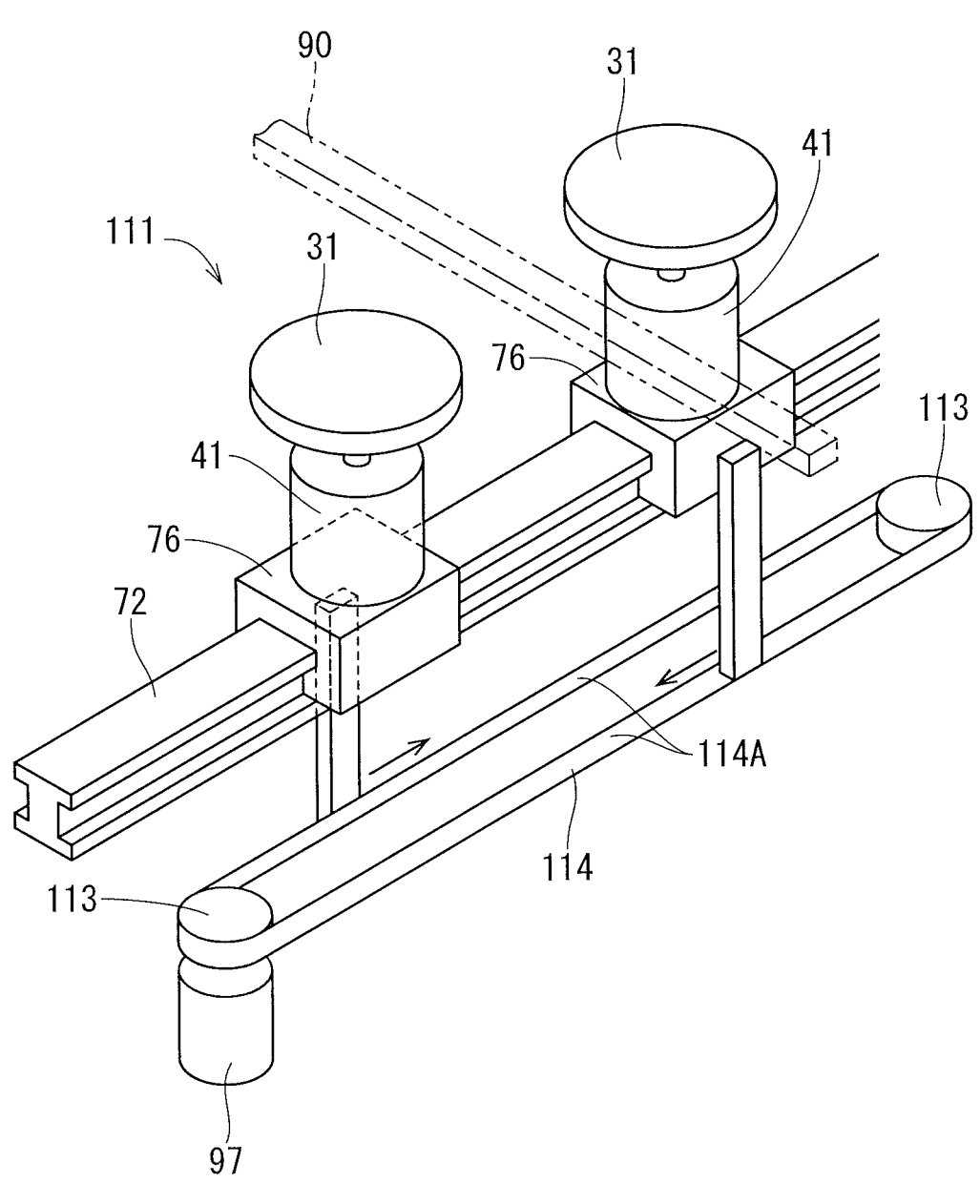
FIG. 16 is a perspective view of a first tool distance changing mechanism according to a modification.

(3) As in a first tool distance changing mechanism 111 illustrated in FIG. 16, the following configuration may be employed. Instead of the pair of racks 99 and the pinion 98 described above, a timing belt 114 is extended between a pair of pulleys 113 and is disposed such that a pair of opposing parts 114A of the timing belt 114 extend in parallel to a guide rail 72. A pair of sliders 76 are fixed to the pair of opposing parts 114A, and one of the pulleys 113 is rotationally driven by a motor 97. The same applies to the second tool distance changing mechanism.

(4) In the first and second embodiments, the pair of first rotary tools 31 are rotationally driven by separate drive sources. However, the pair of first rotary tools 31 may be rotationally driven by a common drive source. Specifically, the following configuration may be employed. A pair of output gears that rotate integrally with a pair of first rotary tools 31 are geared, directly or via an idle gear, with an input gear rotationally driven by one motor so that the pair of first rotary tools 31 are rotationally driven by the one motor. In addition, positions of the pair of output gears are changed with respect to the center of the input gear so that the distance between the pair of first rotary tools 31 can be changed. Alternatively, the following configuration may be employed. A pair of output pulleys that rotate integrally with a pair of first rotary tools 31 are belt-connected, with a timing belt, to an input pulley rotationally driven by one motor so that the pair of first rotary tools 31 are rotationally driven by the one motor. In addition, positions of the pair of output pulleys are changed with respect to the center of the input pulley so that the distance between the pair of first rotary tools 31 can be changed. The same applies to the pair of second rotary tools 32.

(5) Regarding the motors of each embodiment, the motors to rotationally drive the first rotary tools 31 and the second rotary tools 32 may be electric motors or air motors.

Although the present specification and the drawings disclose specific examples of the techniques included in the claims, the techniques according to the claims are not limited to these specific examples, and include various variations and modifications of the specific examples and, in addition, include a part alone taken out from the specific examples.

What is claimed is:

1. A wire coating removal device comprising:

a wire feed path on which a wire is fed in a state of being linearly extended;

a pair of first rotary tools that remove a coating of the wire while sandwiching the wire from a first direction at a first position on the wire feed path;

a pair of first rotary drive mechanisms that separately rotationally drive the pair of first rotary tools;

a pair of second rotary tools that remove the coating of the wire while sandwiching the wire, from a second direction intersecting the first direction, at a second position on the wire feed path;

a pair of second rotary drive mechanisms that separately rotationally drive the second rotary tools;

a first tool distance changing mechanism that makes the pair of first rotary tools approach or separates from each other in association with feeding of the wire;

a second tool distance changing mechanism that makes the pair of second rotary tools approach or separates from each other in association with feeding of the wire; and a pair of slide bases each of which moves in parallel to a third direction that is perpendicular to a wire feed direction and that is oblique to the first direction and the second direction, wherein the pair of first rotary tools remove a part of the coating on a work target part that is dispersedly disposed in a longitudinal direction of the wire, and the pair of second rotary tools then remove a remainder of the coating on the work target part, wherein the first tool distance changing mechanism is configured with one of the first rotary drive mechanisms and one of the second rotary drive mechanisms being mounted on one of the slide bases, and the second tool distance changing mechanism is configured with another of the first rotary drive mechanisms and another of the second rotary drive mechanisms being mounted on another of the slide bases, when the pair of slide bases are moved in a first moving direction in which the pair of slide bases move in opposite directions to each other, the pair of first rotary tools approach each other in both the first direction and the second direction, and the pair of second rotary tools separate from each other in both the first direction and the second direction, and when the pair of slide bases are moved in a second moving direction opposite to the first moving direction in which the pair of slide bases move in opposite directions to each other, the pair of first rotary tools separate from each other in both the first direction and the second direction, and the pair of second rotary tools approach each other in both the first direction and the second direction.

* * * * *